US009715106B2

(12) United States Patent
Momose

(10) Patent No.: US 9,715,106 B2
(45) Date of Patent: Jul. 25, 2017

(54) ELECTRO-OPTICAL DEVICE AND ELECTRONIC APPARATUS

(71) Applicant: SEIKO EPSON CORPORATION, Tokyo (JP)

(72) Inventor: Yoichi Momose, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/058,630

(22) Filed: Mar. 2, 2016

(65) Prior Publication Data

US 2016/0291320 A1 Oct. 6, 2016

(30) Foreign Application Priority Data

Apr. 1, 2015 (JP) ................................. 2015-074872

(51) Int. Cl.
*G02B 26/08* (2006.01)

(52) U.S. Cl.
CPC ................................. *G02B 26/0841* (2013.01)

(58) Field of Classification Search
CPC  G02B 26/0841; G02B 26/08; G02B 26/0833; G02B 26/085; G02B 26/0875; G02B 26/10; G02B 26/0816; G02B 2/0858
USPC ......... 359/198.1–199.4, 200.6–200.8, 221.2, 359/223.1–226.2
See application file for complete search history.

(56) References Cited

U.S. PATENT DOCUMENTS

| 4,662,746 A | 5/1987 | Hornbeck |
| 5,083,857 A | 1/1992 | Hornbeck |
| 5,212,582 A * | 5/1993 | Nelson .................... G09F 9/372 340/815.4 |
| 5,583,688 A * | 12/1996 | Hornbeck .......... G02B 26/0841 359/224.1 |
| 5,600,383 A | 2/1997 | Hornbeck |
| 5,631,782 A | 5/1997 | Smith et al. |
| 5,703,728 A | 12/1997 | Smith et al. |
| 6,552,840 B2 * | 4/2003 | Knipe ................ G02B 26/0841 359/224.1 |

(Continued)

FOREIGN PATENT DOCUMENTS

| JP | H05-196880 A | 8/1993 |
| JP | H08-227042 A | 9/1996 |

(Continued)

*Primary Examiner* — James Phan
(74) *Attorney, Agent, or Firm* — Oliff PLC

(57) ABSTRACT

There is provided an electro-optical device comprising a substrate, a first torsion hinge disposed above the substrate in a thickness direction, the first torsion hinge having a first hinge support portion configured to support the first torsion hinge in the thickness direction, a second torsion hinge disposed above the first torsion hinge in the thickness direction, the second torsion hinge having a second hinge support portion configured to support the second torsion hinge in the thickness direction, and a mirror disposed above the second torsion hinge in the thickness direction, the mirror having a mirror support portion configured to support the mirror in the thickness direction. The second hinge support portion does not overlap the first hinge support portion in a planar view of the substrate, and the mirror support portion does not overlap the second hinge support portion in the planar view of the substrate.

21 Claims, 11 Drawing Sheets

(56) References Cited

U.S. PATENT DOCUMENTS

| | | |
|---|---|---|
| 6,935,759 B1 | 8/2005 | Staker et al. |
| 2002/0041456 A1 | 4/2002 | Takahagi et al. |
| 2007/0188847 A1 | 8/2007 | McDonald et al. |

FOREIGN PATENT DOCUMENTS

| | | |
|---|---|---|
| JP | 2003-057575 A | 2/2003 |
| JP | 2004-145087 A | 5/2004 |
| JP | 2005-517990 A | 6/2005 |

\* cited by examiner

ST1, ST2

ST3

ST4, ST5

ST6

ST7

ST8

ST9

ST10

ST11

ST12

ST13

ST14

ST15, ST16

ST17

ST11

ST14

ST12

ST15

ST13

ST17

ST101

ST102

ST103

ST104

ST105

ELECTRO-OPTICAL DEVICE AND ELECTRONIC APPARATUS

This application claims priority to Japan Patent Application No. 2015-74872 filed Apr. 1, 2015, the entire disclosure of which is hereby incorporated by reference herein in its entirety.

BACKGROUND

1. Technical Field

The disclosure relates to an electro-optical device including a mirror and an electronic apparatus.

2. Related Art

For example, a projection display device, which modulates light emitted from a light source using a plurality of mirrors (micro mirrors) of an electro-optical device called a digital mirror device (DMD), enlarges the modulated light to project using a projection optical system thereby displaying an image onto a screen, is known as an electronic apparatus.

In the electro-optical device which is used for the electronic apparatus, the mirror is supported over a torsion hinge (twist hinge) through a mirror supporting post (mirror supporting section), and is electrically coupled to the torsion hinge. In addition, the torsion hinge is supported by a bias electrode on a substrate side which is formed in the substrate through a hinge post (hinge supporting section), and is electrically coupled to the bias electrode on a substrate side. Thus, while a bias voltage is applied to the mirror from the bias electrode on a substrate side, if a drive voltage is applied to an address electrode, it is possible to swing the mirror using electrostatic force which is generated between the mirror and the address electrode. At this time, the torsion hinge is twisted in a state of supporting the mirror (JP-A-5-196880).

The electro-optical device described in JP-A-5-196880 is required to have a large tilt angle of a mirror, but there is a limitation to twist the angle using one torsion hinge (twist hinge), and thus it is difficult to meet the requirement. In addition, if the tilt angle of the mirror becomes great, stress is concentrated into the one torsion hinge, and thus plastic deformation of the torsion hinge easily occurs. For this reason, there is a problem in which it is impossible to make the mirror greatly tilt with a margin in the electro-optical device.

SUMMARY

An advantage of some aspects of disclosed embodiments is to provide an electro-optical device which can make a mirror greatly tilt with a margin, and an electronic apparatus.

According to embodiments, an electro-optical device includes a substrate; a first torsion hinge (twist hinge) which is separated from the substrate on one surface side of the substrate; a first hinge supporting section which supports the first torsion hinge over the substrate at the one surface side of the substrate; a second torsion hinge which is separated from the first torsion hinge at a side of the first torsion hinge opposite to the substrate; a second hinge supporting section which supports the second torsion hinge over the first torsion hinge in a position that does not overlap the first hinge supporting section in a planar view; a mirror which is separated from the second torsion hinge at a side of the second torsion hinge opposite to the substrate; and a mirror supporting section which supports the mirror over the second torsion hinge in a position that does not overlap the second hinge supporting section in a planar view.

According to another aspect of embodiments, an electro-optical device includes a substrate; a first hinge supporting section (first hinge post) which protrudes toward the substrate at one surface side of the substrate and is supported by the substrate; a first torsion hinge which is supported over the substrate through the first hinge supporting section; a second hinge supporting section (second hinge post) which is provided in a position that does not overlap the first hinge supporting section in a planar view at a side of the first torsion hinge opposite to the substrate and which protrudes toward the first torsion hinge; a second torsion hinge which is supported over the first torsion hinge through the second hinge supporting section; a mirror supporting section (mirror supporting post) which is provided in a position that does not overlap the second hinge supporting section at a side of the second torsion hinge opposite to the substrate; and a mirror which is supported over the second torsion hinge through the mirror supporting section.

According to the aspects of disclosed embodiments, the first torsion hinge is supported over the substrate through the first hinge supporting section, the second torsion hinge is supported over the first torsion hinge through the second hinge supporting section, and the mirror is supported over the second torsion hinge through the mirror supporting section. For this reason, when the mirror greatly tilts, the first torsion hinge is twisted and the second torsion hinge is also twisted. That is, the sum of the twisted angle of the first torsion hinge and the twisted angle of the second torsion hinge becomes a tilt angle of the mirror. Thus, it is possible to set a large tilt angle of the mirror, compared to a case in which one torsion hinge is used. In addition, stress occurring when the mirror greatly tilts distributes to the first torsion hinge and the second torsion hinge, and thus plastic deformation of the torsion hinge hardly occurs. Therefore, it is possible to make the mirror greatly tilt with a margin. Furthermore, a position of the mirror with respect to the substrate becomes higher, compared to a case in which one torsion hinge is used, and thus it is possible to make the mirror greatly tilt.

In the electro-optical device according to embodiments, it is possible to employ an aspect in which the second hinge supporting section is provided in a center in an extending direction of the first torsion hinge, the first hinge supporting section is provided in each of both sides in the extending direction with respect to the second hinge supporting section, and the mirror supporting section is provided in each of both sides in the extending direction with respect to the second hinge supporting section. According to the configuration, since the first hinge supporting section is disposed on both sides of the first torsion hinge, the first hinge supporting section is hardly damaged, even though a load of the second torsion hinge, the mirror or the like is fully applied to the first torsion hinge.

In the electro-optical device according to embodiments, it is preferable that a thickness of the first torsion hinge is greater than that of the second torsion hinge. According to the configuration, even though a load of the second torsion hinge, the mirror or the like is fully applied to the first torsion hinge, the first torsion hinge can withstand the load.

In the electro-optical device according to embodiments, it is preferable that a width of the first torsion hinge is greater than that of the second torsion hinge. According to the configuration, even though a load of the second torsion hinge, the mirror or the like is fully applied to the first torsion hinge, the first torsion hinge can withstand the load.

In the electro-optical device according to embodiments, it is preferable that a stopper, which comes into contact with the mirror when the mirror tilts and limits a tilt range of the mirror, is provided in the first torsion hinge. According to the configuration, it is possible to set a wide tilt range of the mirror, compared to a case in which the stopper is provided on the second torsion hinge.

In the electro-optical device according to embodiments, the mirror is electrically coupled to a bias electrode on the substrate side which is formed on the one surface of the substrate through the mirror supporting section, the second torsion hinge, the second hinge supporting section, the first torsion hinge, and the first hinge supporting section, and electrostatic force may be generated between the mirrors by applying a voltage to an address electrode which is provided in a position that overlaps the mirror in a planar view.

In the electro-optical device according to embodiments, it is possible to employ an aspect in which the address electrode includes an address electrode on the substrate side which is formed on the one surface of the substrate, and a first upper address electrode which is disposed between the address electrode on the substrate side and the mirror and is electrically coupled to the address electrode on the substrate side through a first electrode supporting section. In this case, it is preferable that the address electrode on the substrate side protrudes from the first upper address electrode in a planar view. According to the configuration, it is possible to reliably generate electrostatic force between the mirror and the address electrode on the substrate side, by providing the first upper address electrode between the address electrode on the substrate side and the mirror.

In the electro-optical device according to the aspect of disclosed embodiments, it is possible to employ an aspect in which the address electrode further includes a second upper address electrode which is provided between the first upper address electrode and the mirror, and is electrically coupled to the first upper address electrode through a second electrode supporting section. In this case, it is preferable that the address electrode on the substrate side protrudes from the second upper address electrode in a planar view. According to the configuration, it is possible to reliably generate electrostatic force between the mirror and the address electrode on the substrate side, by providing the first upper address electrode and the second upper address electrode between the address electrode on the substrate side and the mirror.

An electro-optical device according to embodiments can be used for various types of electronic apparatuses, and in this case, a light source unit which emits light source light to the mirror is provided in the electronic apparatus. In addition, if a projection type display device or a head-mounted display device is configured as the electronic apparatus, a projection optical system which projects the light modulated by the mirror is further provided in the electronic apparatus.

BRIEF DESCRIPTION OF THE DRAWINGS

Disclosed embodiments will be described with reference to the accompanying drawings, wherein like numbers reference like elements.

DESCRIPTION OF EXEMPLARY EMBODIMENTS

Figure 1:
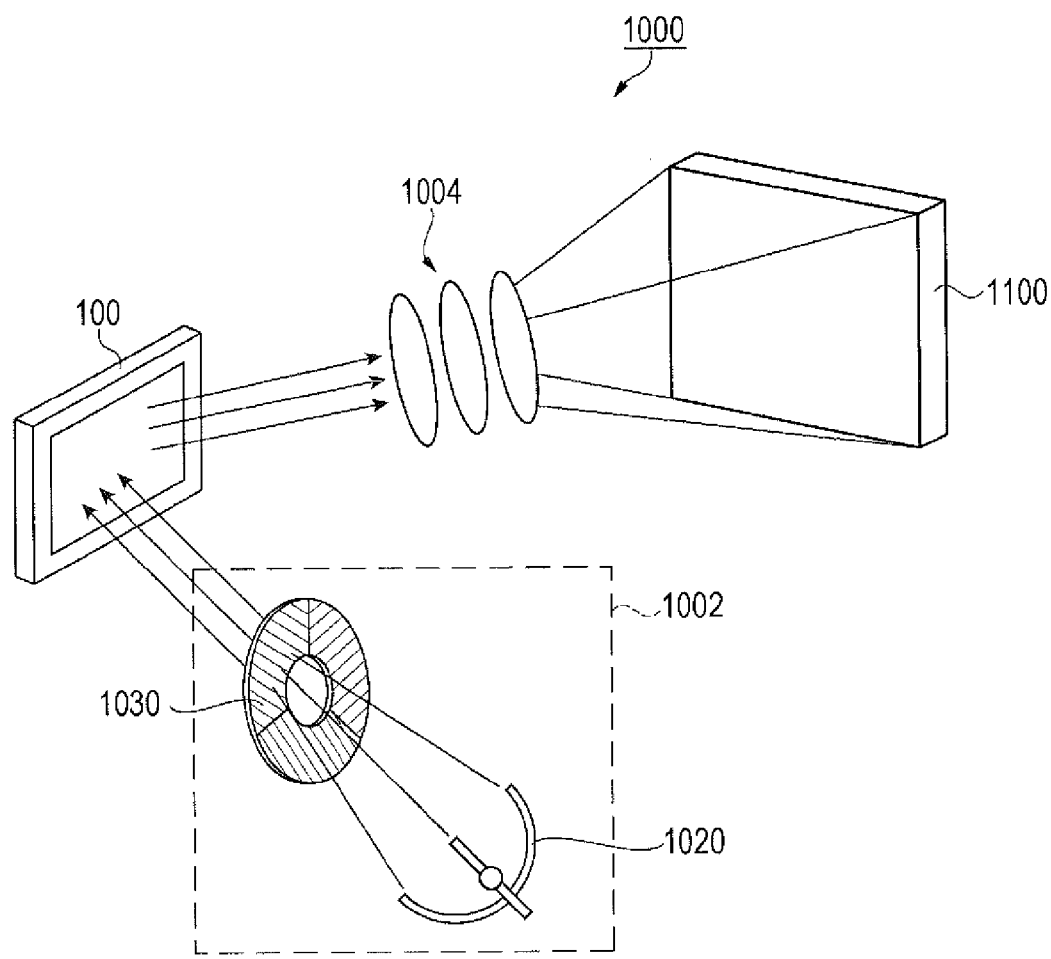
FIG. 1 is a schematic view illustrating an optical system of a projection type display device serving as an electronic apparatus according to an embodiment.

Embodiments will be described with reference to the drawings. In the following description, a projection type display device serving as an electronic apparatus according to an embodiment will be described. In addition, in the figures referred to by the following description, each layer and each member is illustrated in a recognizable size in the figures, and scales are different from each other for each layer and each member. In addition, the number of mirrors or the like is reductively illustrated in the drawings.

Projection Type Display Device Serving as Electronic Apparatus

FIG. 1 is a schematic view illustrating an optical system of a projection type display device serving as an electronic apparatus according to an embodiment. The projection type display device 1000 illustrated in FIG. 1 includes a light source unit 1002, an electro-optical device 100 which modulates light emitted from the light source unit 1002 in response to image information, and a projection optical system 1004 which projects the light modulated by the electro-optical device 100 onto an image-projected body 1100 such as a screen as a projection image. The light source unit 1002 includes a light source 1020 and a color filter 1030. The light source 1020 emits white light, the color filter 1030 emits lights of various colors in accordance with rotation, and the electro-optical device 100 modulates the incident light at timing synchronous to the rotation of the color filter 1030. Instead of the color filter 1030, a fluorescent substrate, which converts the light emitted from the light source 1020 into lights of various colors, may be used. In addition, the light source unit 1002 and the electro-optical device 100 may be provided for each light of various colors.

Configuration of Electro-Optical Device 100

Entirety of Electro-Optical Device 100

Figure 2A:
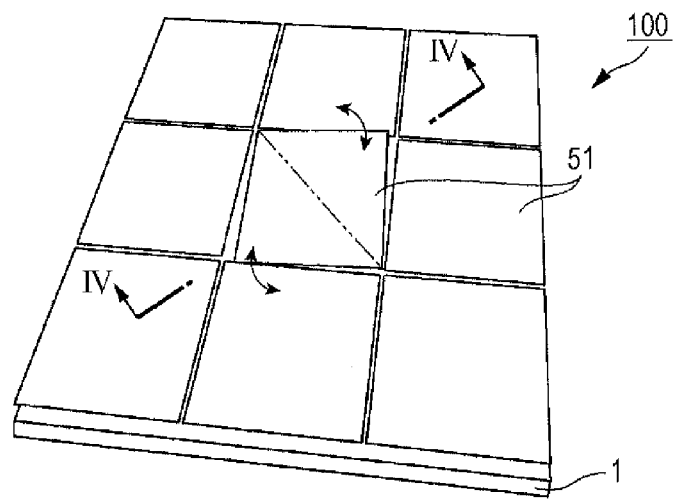
FIGS. 2A and 2B are explanatory views schematically illustrating a configuration of an electro-optical device according to an embodiment.
Figure 2B:
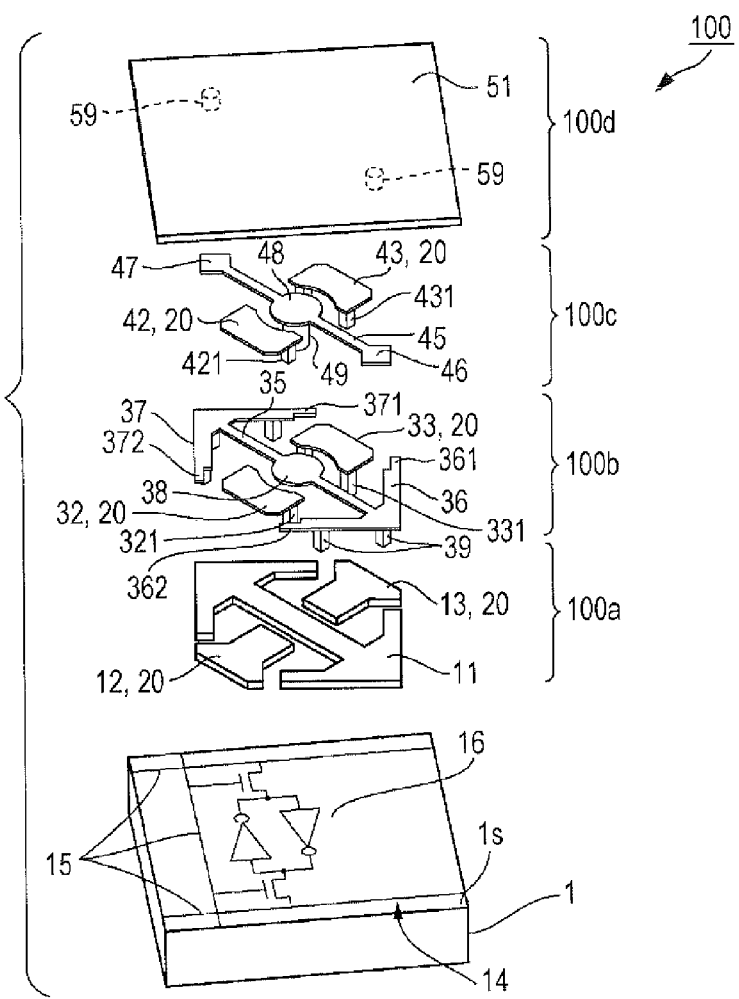
Figure 3A:
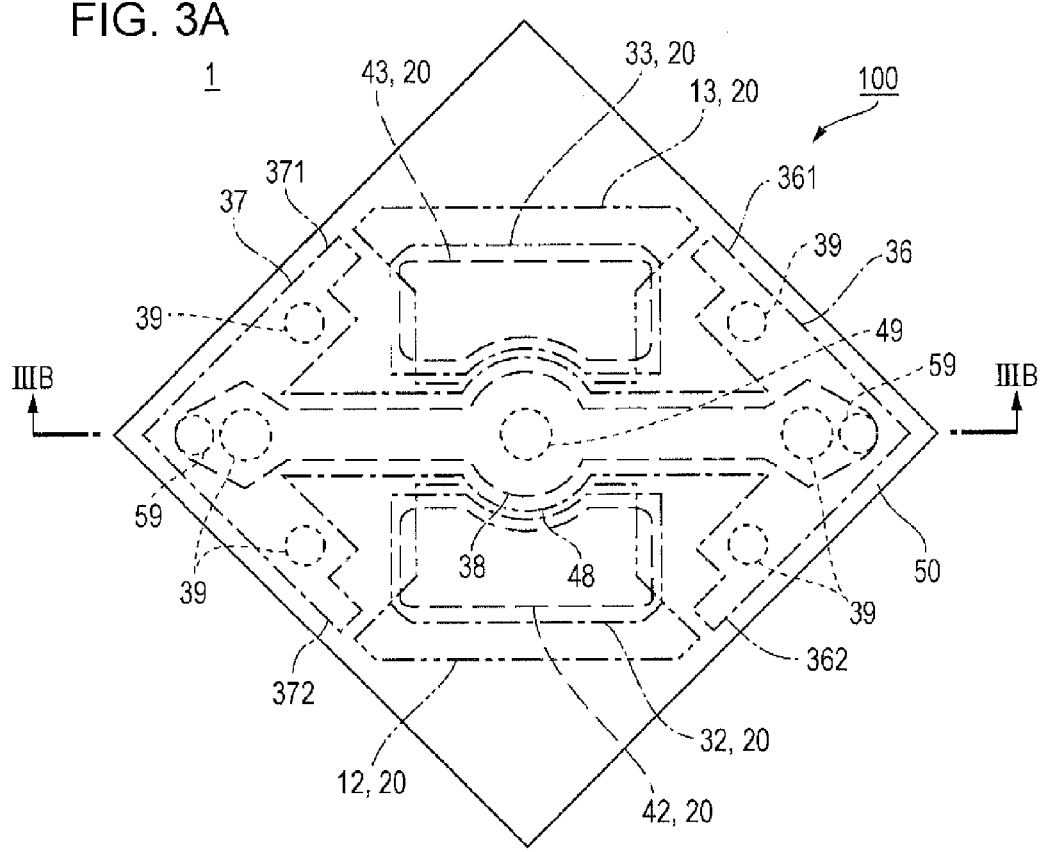
FIGS. 3A and 3B are explanatory views illustrating a detailed configuration of the electro-optical device according to an embodiment.
Figure 3B:
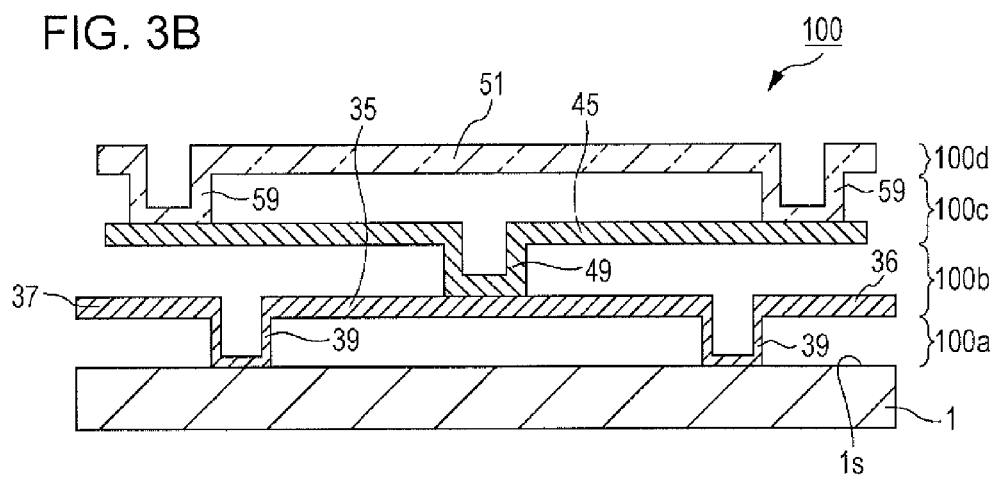
Figure 4A:
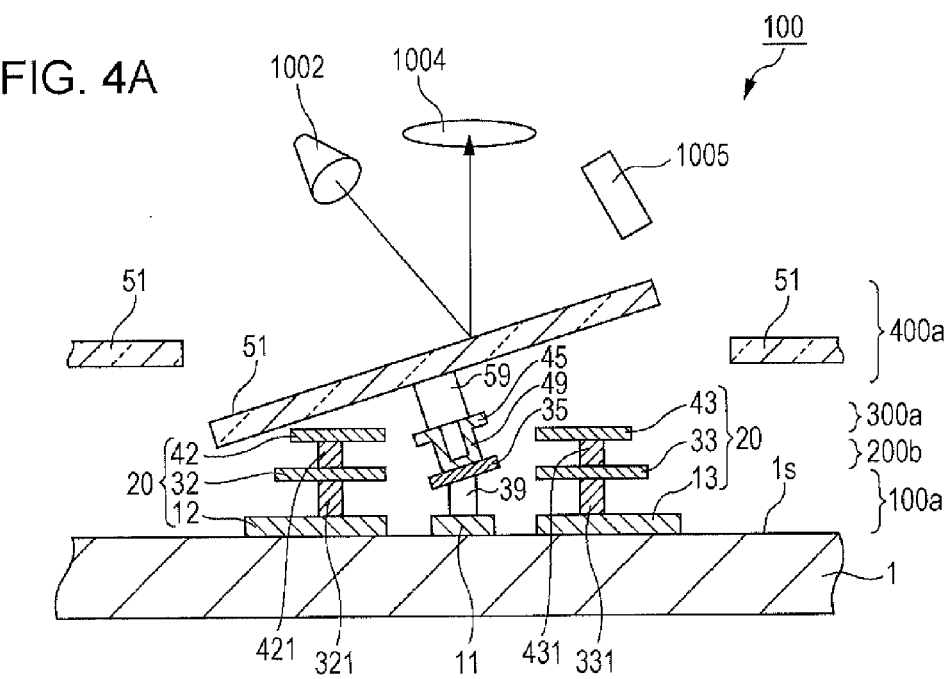
FIGS. 4A and 4B are explanatory views illustrating an operation of the electro-optical device according to an embodiment.
Figure 4B:
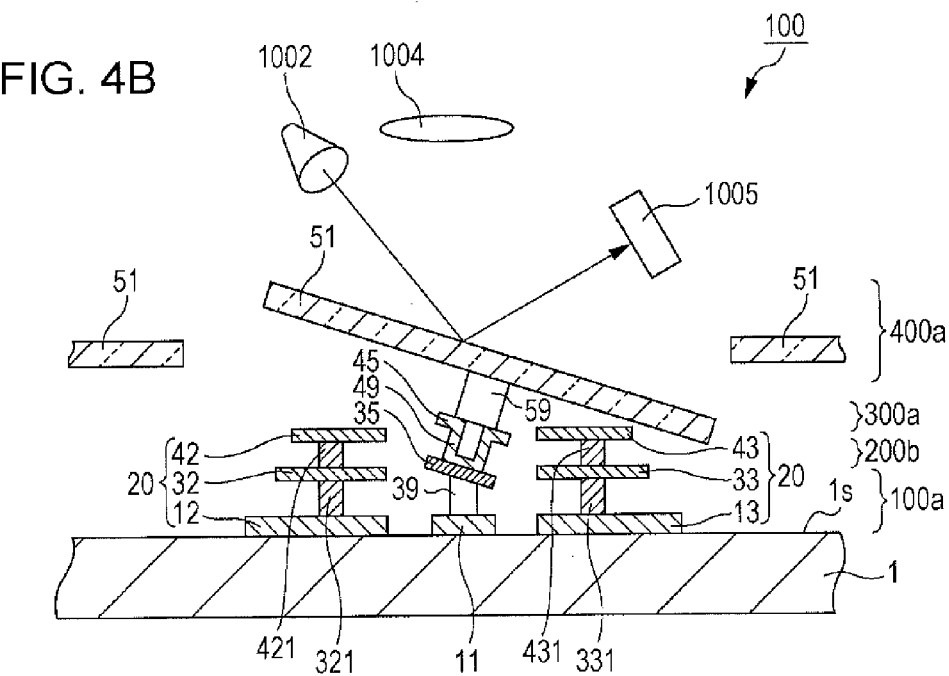

FIGS. 2A and 2B are explanatory views schematically illustrating a configuration of the electro-optical device 100 according to an embodiment, and FIGS. 2A and 2B are respectively an explanatory view in which the electro-optical device 100 is viewed from the mirror 51 side and an exploded perspective view of the electro-optical device 100. FIGS. 3A and 3B are explanatory views illustrating a detailed configuration of the electro-optical device 100 according to an embodiment, and FIGS. 3A and 3B are respectively a plan view in which the mirror 51 is omitted, and a sectional view taken along line IIIB-IIIB. FIGS. 4A and 4B are explanatory views illustrating an operation of the electro-optical device 100 according to an embodiment. FIGS. 4A and 4B are respectively a sectional view taken along line IV-IV schematically illustrating a state in which the mirror 51 is tilted on one side, and a sectional view taken along line IV-IV schematically illustrating a state in which the mirror 51 is tilted in another side.

FIG. 2B, FIGS. 3A and 3B, and FIGS. 4A and 4B illustrate only one mirror 51 among a plurality of mirrors 51 which are formed in the electro-optical device 100. In addition, in FIG. 3A, illustration of a bias electrode 11 on the substrate side is omitted, address electrodes 12 and 13 on the substrate side are denoted by two-dot chain lines, a first torsion hinge (first twist hinge) 35 is denoted by an one-dot chain line, and a second torsion hinge (second twist hinge) 45 is denoted by a long dashed line. In addition, in FIG. 3A, a first hinge post (first hinge supporting section) 39, a second hinge post (second hinge supporting section) 49, and a mirror supporting post (mirror supporting section) 59 are denoted by dotted lines. In addition, in FIG. 3B, only a second layer section 100b, a third layer section 100c, and a fourth layer section 100d of the electro-optical device 100 are illustrated, and illustration of a first layer section 100a which includes the bias electrode 11 on the substrate side, the address electrodes 12 and 13 on the substrate side, and the like is omitted.

As illustrated in FIG. 2A, in the electro-optical device 100, a plurality of mirrors 51 are disposed in a matrix at one surface 1s side of a substrate 1, and the mirror 51 is separated from the substrate 1. The mirror 51 is, for example, a silicon substrate. The substrate 1 is, for example, a micro mirror having a plane size in which a length of one side thereof is, for example, 10 μm to 30 μm. The mirrors 51 are disposed with an arrangement, for example, from 600× 800 to 1920×1080, and one mirror 51 corresponds to one pixel of an image. A surface of the mirror 51 is configured by a reflective surface which is formed of a reflective metal film such as aluminum. In the present embodiment, the mirror 51 is configured by an aluminum layer with a thickness of, for example, 0.3 μm.

As illustrated in FIG. 2B, FIGS. 3A and 3B, and FIGS. 4A and 4B, the electro-optical device 100 includes a first layer section 100a having the bias electrode 11 on the substrate side, the address electrodes 12 and 13 on the substrate side, and the like which are formed on the one surface 1s of the substrate 1, and an address circuit 14 is formed on the substrate 1 in the first layer section 100a. The address circuit 14 includes a memory cell for selectively controlling an operation of each mirror 51, wires 15 such as a word line and a bit line, or the like, and includes a circuit configuration similar to a random access memory (RAM) having a CMOS circuit 16.

In addition, the electro-optical device 100 according to the present embodiment, which will be hereinafter described, includes the second layer section 100b including the first torsion hinge 35 or the like, the third layer section 100c including the second torsion hinge 45 or the like, and the fourth layer section 100d including the mirror 51.

In more detail, first of all, the first layer section 100a includes the first hinge post 39 with conductivity which is coupled to the bias electrode 11 on the substrate side on the one surface 1s of the substrate 1, and the first hinge post 39 is supported by the bias electrode 11 on the substrate side. In addition, the first layer section 100a includes first electrode posts (first electrode supporting sections) 321 and 331 with conductivity which are coupled to the address electrodes 12 and 13 on the substrate side on the one surface 1s of the substrate 1, and the first electrode posts 321 and 331 are supported by the address electrodes 12 and 13 on the substrate side.

The second layer section 100b includes the first torsion hinge 35 with conductivity which is supported over the substrate 1 through the first hinge post 39, and the first torsion hinge 35 is separated from the substrate 1. The first torsion hinge 35 is a metal member which has a narrow width dimension and linearly extends. In the present embodiment, the first hinge post 39 is formed as one piece together with the first torsion hinge 35. More specifically, hinge arms 36 and 37 which extend in a direction intersecting from both end sections are provided in the first torsion hinge 35, and the first hinge posts 39 of the hinge arms 36 and 37 on the substrate 1 side are formed as one piece. Thus, the first hinge post 39 protrudes toward the substrate 1 (the bias electrode 11 on the substrate side) from the first torsion hinge 35. In the present embodiment, the first torsion hinge 35 is, for example, a single film of an aluminum layer, or a laminated film in which an aluminum layer is laminated on a titanium layer or vice versa, and a thickness thereof is, for example, 0.06 μm.

In addition, the second layer section 100b includes first upper address electrodes 32 and 33 which are supported over the substrate 1 through the first electrode posts 321 and 331, and the first upper address electrodes 32 and 33 are separated from the substrate 1. In the present embodiment, the first electrode post 321 and the first upper address electrode 32 are formed as one piece, and the first electrode post 331 and the first upper address electrode 33 are formed as one piece. Thus, the first electrode posts 321 and 331 protrude toward the substrate 1 (the address electrodes 12 and 13 on the substrate side) from the first upper address electrodes 32 and 33.

In addition, the second layer section 100b includes the second hinge post 49 with conductivity which is coupled to a side opposite to the substrate 1 with respect to the first torsion hinge 35, and second electrode posts (second electrode supporting sections) 421 and 431 which are coupled to a side opposite to the substrate 1 with respect to the first upper address electrodes 32 and 33. In the present embodiment, the second hinge post 49 is coupled to one place of a wide section 38 which is formed in the center in a length direction of the first torsion hinge 35.

The third layer section 100c includes the second torsion hinge 45 with conductivity which is supported over the first torsion hinge 35 through the second hinge post 49, and the second torsion hinge 45 is separated at a side opposite to the substrate 1 from the first torsion hinge 35. The second torsion hinge 45 is a metal member which has a narrow width dimension and linearly extends, and overlaps the first torsion hinge 35 in a planar view. In the present embodiment, the second hinge post 49 and the second torsion hinge 45 are formed as one piece. More specifically, a wide section 48 is formed in a central portion in a length direction of the second torsion hinge 45, and the second hinge post 49 and the second torsion hinge 45 are formed as one piece on the substrate 1 side of the wide section. Thus, the second hinge post 49 protrudes toward the first torsion hinge 35 from the second torsion hinge 45. In the present embodiment, the second torsion hinge 45 is, for example, a single film of an aluminum layer, or a laminated film in which an aluminum layer is laminated on a titanium layer or vice versa, and a thickness thereof is, for example, 0.04 µm.

In addition, the third layer section 100*c* includes second upper address electrodes 42 and 43 which are supported by the first upper address electrodes 32 and 33 through second electrode posts 421 and 431, and the second upper address electrodes 42 and 43 are separated from the first upper address electrodes 32 and 33. In the present embodiment, the second electrode post 421 and the second upper address electrode 42 are formed as one piece, and the second electrode post 431 and the second upper address electrode 43 are formed as one piece. Thus, the second electrode posts 421 and 431 protrude toward the first upper address electrodes 32 and 33 from the second upper address electrodes 42 and 43.

In addition, the third layer section 100*c* includes the mirror supporting post (mirror supporting section) 59 with conductivity which is coupled to a side opposite to the substrate 1 with respect to the second torsion hinge 45. In the present embodiment, the mirror supporting post 59 is formed in two places, and the two mirror supporting posts 59 are respectively coupled to both end sections 46 and 47 of the second torsion hinge 45.

The fourth layer section 100*d* includes the mirror 51 which is supported over the second torsion hinge 45 through the mirror supporting post 59. In the present embodiment, the mirror supporting post 59 and the mirror 51 are formed as one piece. More specifically, the substrate 1 side of the mirror 51 and the mirror supporting post 59 are formed as one piece. Thus, the mirror supporting post 59 protrudes toward the second torsion hinge 45 from the mirror 51. In the present embodiment, the mirror 51 is polygon, and the second torsion hinge 45 extends in a diagonal direction of the mirror 51. For this reason, the mirror supporting post 59 is coupled to both end sections 46 and 47 of the second torsion hinge 45 near the corner of the mirror 51.

In the electro-optical device 100 configured in this way, the second hinge post 49 is provided in a position which does not overlap the first hinge post 39 in a planar view, and the mirror supporting post 59 is provided in a position which does not overlap the second hinge post 49 in a planar view. More specifically, the second hinge post 49 is provided in the center in an extending direction of the first torsion hinge 35 and the second torsion hinge 45 in a planar view, and the first hinge post 39 are respectively provided on both sides in an extending direction of the first torsion hinge 35 and the second torsion hinge 45 with respect to the second hinge post 49 in a planar view. In addition, the mirror supporting posts 59 are respectively provided on both sides in an extending direction of the first torsion hinge 35 and the second torsion hinge 45 with respect to the second hinge post 49 in a planar view.

In the present embodiment, a thickness of the first torsion hinge 35 is set to be greater than that of the second torsion hinge 45. In addition, a width of the first torsion hinge 35 is set to be greater than that of the second torsion hinge 45.

Here, when tilting, the mirror 51 comes into contact with tips of the hinge arms 36 and 37 of the first torsion hinge 35 and thereby a tilt range of the mirror 51 is limited. Accordingly, stoppers 361, 362, 371, and 372 are formed to prevent the mirror 51 and the second upper address electrodes 42 and 43 from coming into contact with each other. In the present embodiment, the stoppers 361, 362, 371, and 372 are formed as a spring chip having a spring property.

Configuration of Drive Element 20

In the present embodiment, a drive element 20, which drives the mirror 51 to tilt by generating electrostatic force, is configured between the address electrodes 12 and 13 on the substrate side and the first upper address electrodes 32 and 33, and the mirrors 51. In addition, in the present embodiment, the second upper address electrodes 42 and 43, which are disposed between the first upper address electrodes 32 and 33 and the mirror 51, also configure the drive element 20 which drives the mirror 51 to tilt by generating electrostatic force between the mirrors 51. For this reason, an interval between the mirror 51 and the second upper address electrodes 42 and 43 is narrowed, and thus it is possible to drive the mirror 51 with good responsiveness.

As illustrated in FIG. 3A and FIGS. 4A and 4B, the first upper address electrode 32 and the second upper address electrode 42 are formed in the same size as each other. Alternatively, the first upper address electrode 32 is larger than the second upper address electrode 42, and the first upper address electrode 32 is formed so as to protrude toward the outside (side separated from the first torsion hinge (first twist hinge) 35) from the second upper address electrode 42. In the same manner, the first upper address electrode 33 and the second upper address electrode 43 are formed in the same size as each other. Alternatively, the first upper address electrode 33 is larger than the second upper address electrode 43, and the first upper address electrode 33 is formed so as to protrude toward the outside (side separated from the first torsion hinge 35) from the second upper address electrode 43.

In contrast to this, the address electrode 12 on the substrate side is larger than the first upper address electrode 32 and the second upper address electrode 42, and the address electrode 12 on the substrate side is formed so as to protrude toward the outside (side separated from the first torsion hinge 35) from the first upper address electrode 32 and the second upper address electrode 42. In the same manner, the address electrode 13 on the substrate side is larger than the first upper address electrode 33 and the second upper address electrode 43, and the address electrode 13 on the substrate side is formed so as to protrude toward the outside (side separated from the first torsion hinge 35) from the first upper address electrode 33 and the second upper address electrode 43.

For this reason, the first upper address electrodes 32 and 33 are provided between the address electrodes 12 and 13 on the substrate side and the mirror 51, and furthermore, even if the second upper address electrodes 42 and 43 are provided between the first upper address electrodes 32 and 33 and the mirror 51, it is possible to reliably generate electrostatic force between the mirror 51 and the address electrodes 12 and 13 on the substrate side.

Operation

In the electro-optical device 100 configured in this way, a drive voltage is applied to the address electrodes 12 and 13 on the substrate side, the first upper address electrodes 32 and 33, and the second upper address electrodes 42 and 43, and thereby, as illustrated in FIGS. 4A and 4B, when the mirror 51 tilts toward the address electrode 12 on the substrate side, the first upper address electrode 32, and the second upper address electrode 42, or when the mirror 51 tilts toward the address electrode 13 on the substrate side, the first upper address electrode 33, and the second upper address electrode 43, the first torsion hinge (first twist hinge) 35 and the second torsion hinge (second twist hinge) 45 are twisted. Then, when applying the drive voltage to the address electrodes 12 and 13 on the substrate side, the first upper address electrodes 32 and 33, and the second upper address electrodes 42 and 43 is stopped and thereby a suction force for the mirror 51 is lost, the first torsion hinge 35 and the second torsion hinge 45 exert a force for returning the mirror 51 to a posture parallel to the substrate 1.

At this time, as illustrated in FIG. 4A, if the mirror 51 tilts toward the address electrode 12 on the substrate side, the first upper address electrode 32, and the second upper address electrode 42, the electro-optical device 100 enters an ON state in which the light emitted from the light source unit 1002 is reflected toward the projection optical system 1004 by the mirror 51. In contrast to this, as illustrated in FIG. 3B, if the mirror 51 tilts toward the address electrode 13 on the substrate side, the first upper address electrode 33, and the second upper address electrode 43, the electro-optical device 100 enters an OFF state in which the light emitted from the light source unit 1002 is reflected toward a light absorption device 1005 by the mirror 51. In the OFF state, the light is not reflected toward the projection optical system 1004. The driving is performed by each of the plurality of mirrors 51, and as the result, the light emitted from the light source unit 1002 is modulated into image light by the plurality of mirrors 51, is projected from the projection optical system 1004, and thereby image is displayed.

Main Effects of the Present Embodiment

As described above, in the electro-optical device 100 according to the present embodiment, the first torsion hinge (first twist hinge) 35 is supported over the substrate 1 through the first hinge post (first hinge supporting section) 39, the second torsion hinge (second twist hinge) 45 is supported over the first torsion hinge 35 through the second hinge post (second hinge supporting section) 49, and the mirror 51 is supported over the second torsion hinge 45 through the mirror supporting post (mirror supporting section) 59. For this reason, a position of the mirror 51 with respect to the substrate 1 becomes higher, compared to a case in which one torsion hinge is used in the related art, and thus it is possible to make the mirror 51 greatly tilt. In addition, when the mirror 51 greatly tilts, the first torsion hinge 35 is twisted, and the second torsion hinge 45 is also twisted. That is, the sum of the twisted angle of the first torsion hinge 35 and the twisted angle of the second torsion hinge 45 becomes the tilted angle of the mirror 51. Thus, it is possible to set a greatly tilted angle of the mirror 51, compared to a case in which one torsion hinge is used. In addition, stress occurring when the mirror 51 greatly tilts distributes to the first torsion hinge 35 and the second torsion hinge 45, and thus plastic deformation of the torsion hinge hardly occurs. Therefore, it is possible to make the mirror 51 greatly tilt with a margin.

In addition, since the first hinge post 39 is disposed on both sides of the first torsion hinge 35, the first hinge post 39 is hardly damaged, even though a load of the second torsion hinge 45, the mirror 51 or the like is fully applied to the first torsion hinge 35.

In addition, a thickness of the first torsion hinge 35 is greater than that of the second torsion hinge 45, a width of the first torsion hinge 35 is greater than that of the second torsion hinge 45. For this reason, even though a load of the second torsion hinge 45, the mirror 51 or the like is fully applied to the first torsion hinge 35, the first torsion hinge 35 can withstand the load.

In addition, since the stoppers 361, 362, 371, and 372 are provided in the first torsion hinge 35, it is possible to set a wide tilt range of the mirror 51, compared to a case in which stoppers are provided on the second torsion hinge.

Method of Manufacturing Electro-Optical Device

Steps for forming the first torsion hinge (first twist hinge) 35, the second torsion hinge (second twist hinge) 45, the mirror supporting post (mirror supporting section) 59, and the mirror 51, among steps for manufacturing the electro-optical device 100 according to an embodiment, will be mainly described with reference to FIG. 2B and FIG. 5A to FIG. 8F. FIGS. 5A to 5E, FIGS. 6A to 6E, and FIGS. 7A to 7D are step sectional views illustrating an example of a method of manufacturing the electro-optical device 100 according to an embodiment. FIGS. 8A to 8F and FIGS. 9A to 9F are plan views of layers formed in the manufacturing steps of the electro-optical device 100 according to an embodiment. FIG. 5A to FIG. 8F illustrated only one mirror 51 among the plurality of mirrors 51 which are formed in the electro-optical device 100. In addition, in the following description, a relationship between the respective sections described with reference to FIG. 2B will also be appropriately described.

Figure 5A:
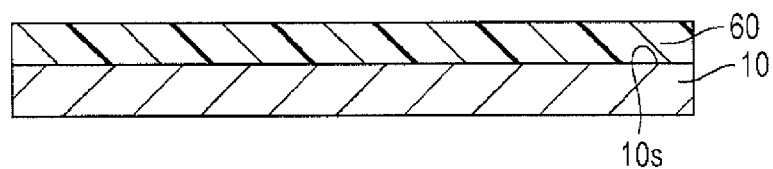
FIGS. 5A to 5E are sectional views illustrating processes of a manufacturing method of the electro-optical device according to an embodiment.

In the beginning, as illustrated in FIG. 5A, in step ST1, the address circuit 14, the bias electrode 11 on the substrate side, the address electrodes 12 and 13 on the substrate side, and the like which are described with reference to FIG. 2B are formed in the wafer 10 which is configured by a silicon substrate.

Figure 5B:
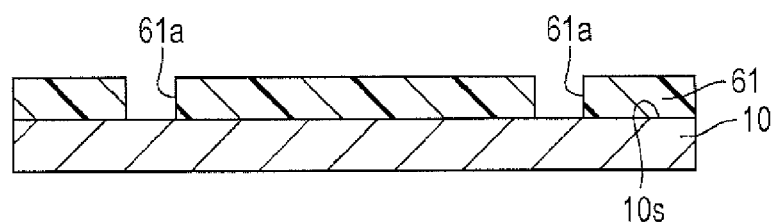
Figure 8A:
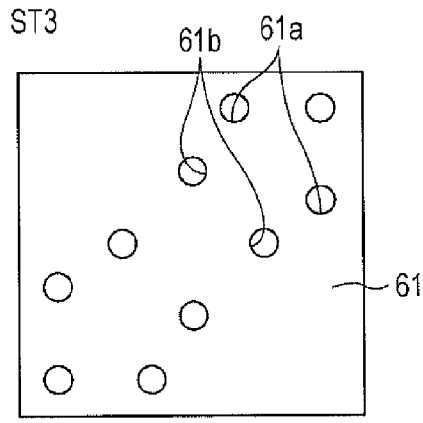
FIGS. 8A to 8F are plan views of layers formed by manufacturing processes of the electro-optical device according to an embodiment.

Subsequently, in step ST2, a first photosensitive resist layer 60 which is configured by a positive-type organic photoresist or the like is formed on one surface 10s of the wafer 10 (substrate), and thereafter, in step ST3 illustrated in FIG. 5B, exposure and development are performed for the first photosensitive resist layer 60, and thereby an opening (opening for the first hinge supporting section) 61a for the first hinge post for forming the first hinge post (first hinge supporting section) 39 is formed. At this time, as illustrated in FIG. 8A, an opening (opening for the first electrode supporting section) 61b for the first electrode post for forming the first electrode posts (first electrode supporting sections) 321 and 331 is also formed. A thickness of the first photosensitive resist layer 60 is, for example, 1 μm, and opening diameters of the opening 61a for the first hinge post and the opening 61b for the first electrode post are, for example, 0.6 μm. The steps ST2 and ST3 are a first sacrificial layer forming step which forms a first sacrificial layer 61 which includes the opening 61a for the first hinge post and the opening 61b for the first electrode post.

Figure 5C:
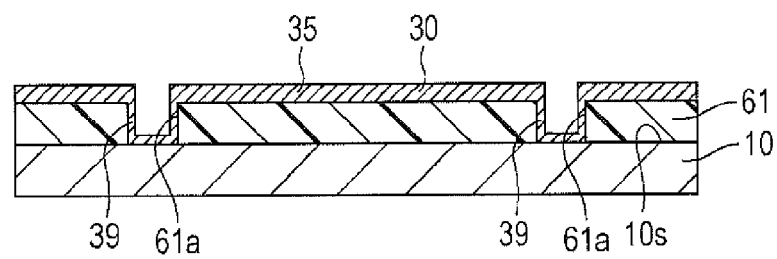
Figure 8D:
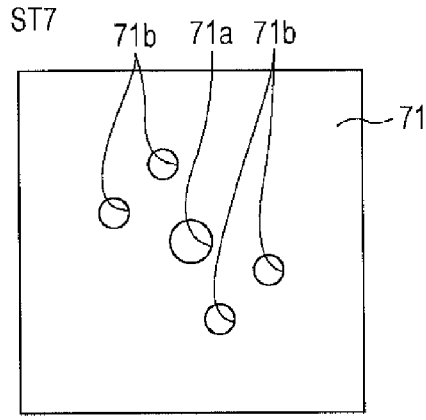
Figure 8B:
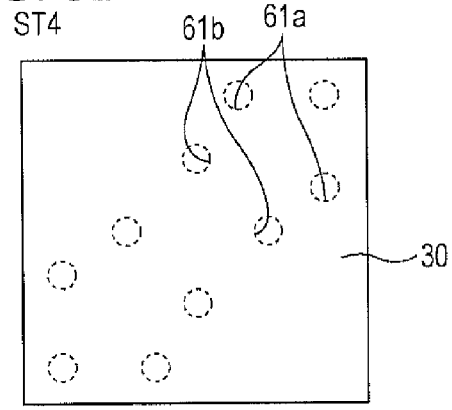

Subsequently, in step ST4 (first conductive film forming step) illustrated in FIG. 5C, a first conductive film 30 is formed on an entire surface (surface opposite to the wafer 10) of the first sacrificial layer 61 (refer to FIG. 8B). At this time, the first conductive film 30 is also formed on a wall surface and a bottom surface of the opening 61a for the first hinge post. The first conductive film 30 is, for example, a single film of an aluminum layer, or a laminated film in which an aluminum layer is laminated on a titanium layer or vice versa, and a thickness thereof is, for example, 0.06 μm.

Figure 8E:
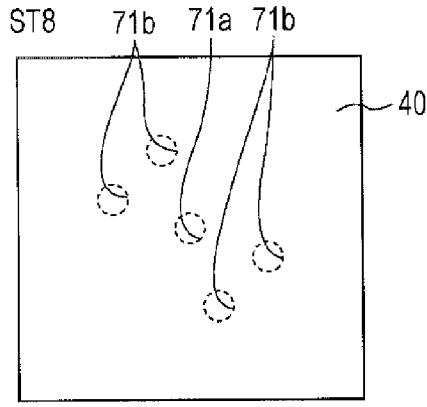
Figure 8C:
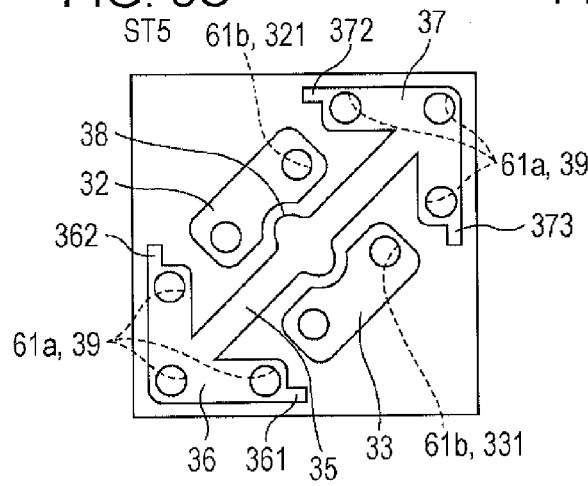

Subsequently, in step ST5 (first patterning step), the first conductive film 30 is etched in a state in which a resist mask is formed on a surface (surface at a side opposite to the wafer 10) of the first conductive film 30, and thereby the first torsion hinge 35 is formed. At this time, the first hinge post 39 and the first torsion hinge 35 are formed as one piece by the first conductive film 30 remaining in the opening 61a for the first hinge post. At this time, as illustrated in FIG. 8C, the hinge arms 36 and 37, which include the stoppers 361, 362, 371, and 372 are also formed in the first torsion hinge 35. In addition, the first upper address electrodes 32 and 33 are simultaneously formed, and the first electrode posts 321 and 331 are formed in the inside of the opening 61b for the first electrode post.

Figure 5D:
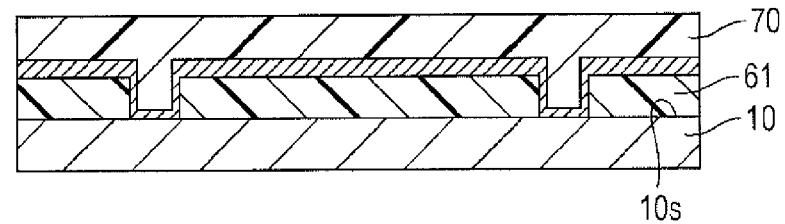
Figure 5E:
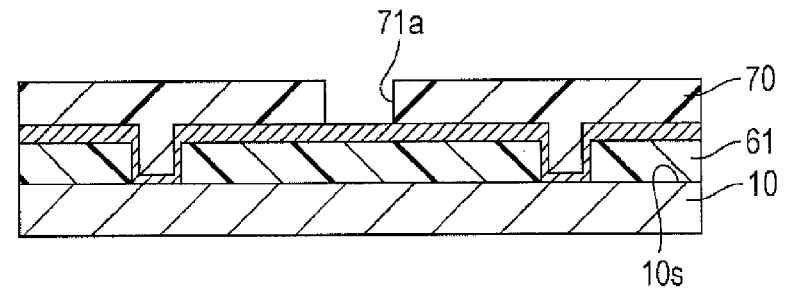

Subsequently, in step ST6 illustrated in FIG. 5D, after a second photosensitive resist layer 70 which is configured by a positive-type organic photoresist or the like is formed such that the first torsion hinge 35 is covered from a side opposite to the wafer 10, exposure and development is performed for the second photosensitive resist layer 70 in step ST7 illustrated in FIG. 5E, and thereby an opening (opening for the second hinge supporting section) 71a for the second hinge post for forming the second hinge post 49 is formed. At this time, as illustrated in FIG. 8D, an opening (opening for the second electrode supporting section) 71b for the second electrode post for forming the second electrode posts (second electrode supporting sections) 421 and 431 are also formed. A thickness of the second photosensitive resist layer 70 is, for example, 1.5 µm, and opening diameters of the opening 71a for the second hinge post and the opening 71b for the second electrode post are, for example, 0.8 µm. The steps ST6 and ST7 are a second sacrificial layer forming step which forms a second sacrificial layer 71 that includes the opening 71a for the second hinge post and the opening 71b for the second electrode post.

Figure 6A:
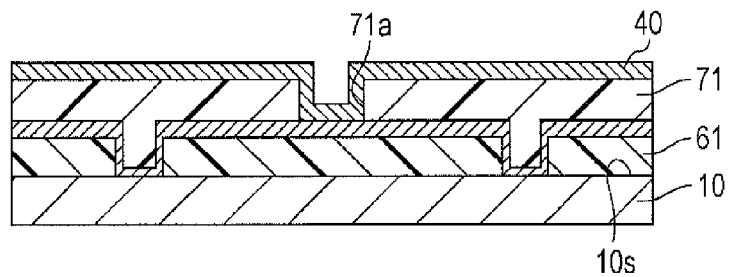
FIGS. 6A to 6E are sectional views illustrating processes of a manufacturing method of the electro-optical device according to an embodiment.

Subsequently, in step ST8 (second conductive film forming step) illustrated in FIG. 6A, a second conductive film 40 is formed on an entire surface (surface at a side opposite to the wafer 10) of the second sacrificial layer 71 (refer to FIG. 8E). The second conductive film 40 is, for example, a single film of an aluminum layer, or a laminated film in which an aluminum layer is laminated on a titanium layer or vice versa, and a thickness thereof is, for example, 0.04 µm.

Figure 6B:
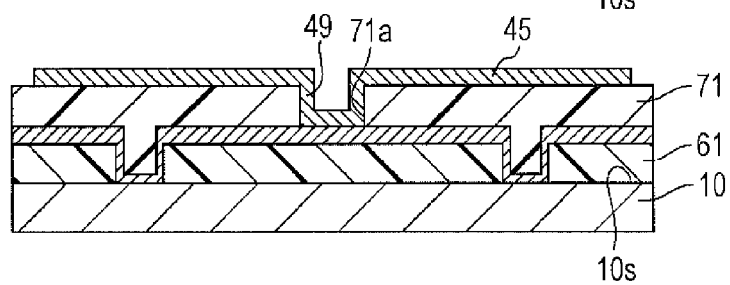
Figure 8F:
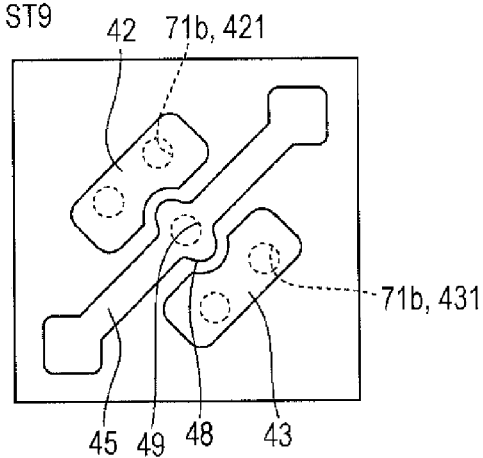

Subsequently, in step ST9 (second patterning step) illustrated in FIG. 6B, the second conductive film 40 is etched in a state in which a resist mask is formed on a surface (surface at a side opposite to the wafer 10) of the second conductive film 40, and thereby the second torsion hinge 45 is formed. At this time, the second hinge post 49 and the second torsion hinge 45 are formed as one piece by the second conductive film 40 remaining in the opening 71a for the second hinge post. At this time, as illustrated in FIG. 8F, the second upper address electrodes 42 and 43 are simultaneously formed, and the second electrode posts 421 and 431 are formed in the inside of the opening 71b for the second electrode post.

Figure 6C:
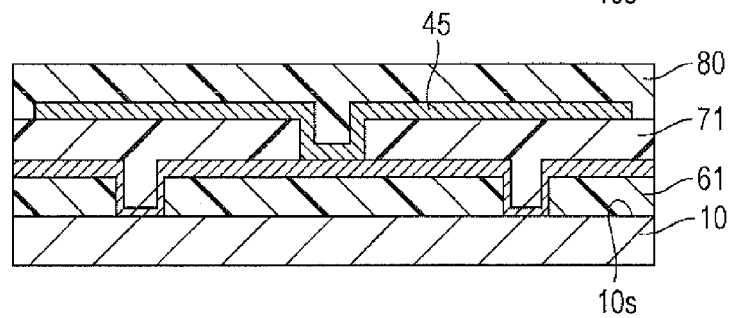
Figure 6D:
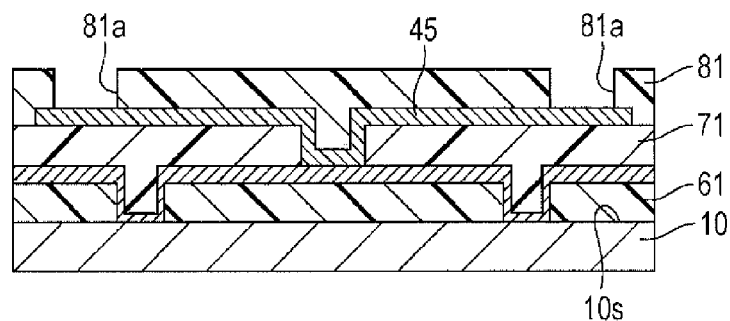
Figure 9A:
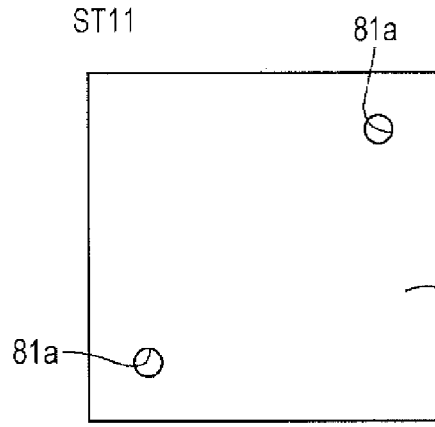
FIGS. 9A to 9F are plan views of layers formed by manufacturing processes of the electro-optical device according to an embodiment.
Figure 9D:
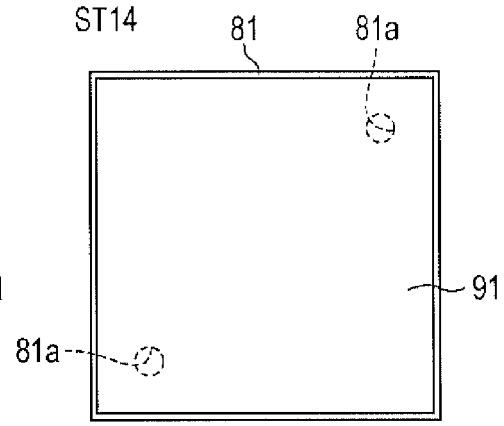

Subsequently, in step ST10 illustrated in FIG. 6C, after a third photosensitive resist layer 80 which is configured by a positive-type organic photoresist or the like is formed such that the second torsion hinge 45 is covered from a side opposite to the wafer 10, exposure and development is performed for the third photosensitive resist layer 80 in step ST11 illustrated in FIG. 6D, and thereby an opening (opening for the mirror supporting section) 81a for the mirror supporting post for forming the mirror supporting post (mirror supporting section) 59 is formed (refer to FIG. 9A). At this time, a thickness of the third photosensitive resist layer 80 is, for example, 1.5 µl, and an opening diameter of the opening 81a for the mirror supporting post is, for example, 0.8 µm. The steps ST10 and ST11 are a third sacrificial layer forming step which forms a third sacrificial layer 81 that includes the opening 81a for the mirror supporting post.

Figure 6E:
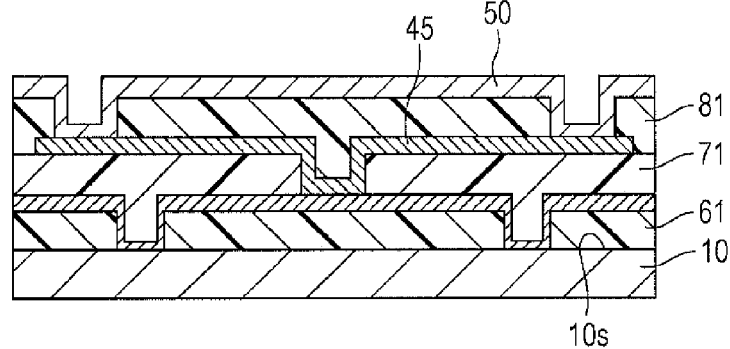
Figure 9B:
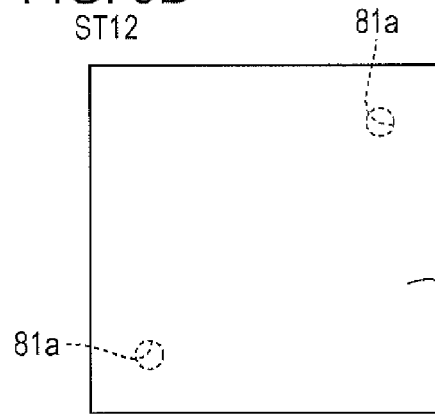
Figure 9E:
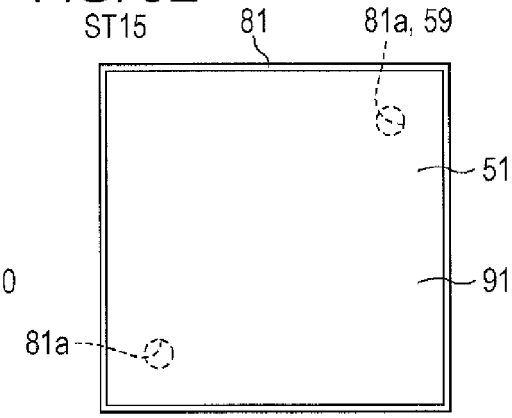

Subsequently, in step ST12 (third conductive film forming step) illustrated in FIG. 6E, a third conductive film 50 is formed on an entire surface (surface at a side opposite to the wafer 10) of the third sacrificial layer 81 (refer to FIG. 9B). The third conductive film 50 is, for example, an aluminum layer with a thickness of, for example, 0.3 µm.

Figure 7A:
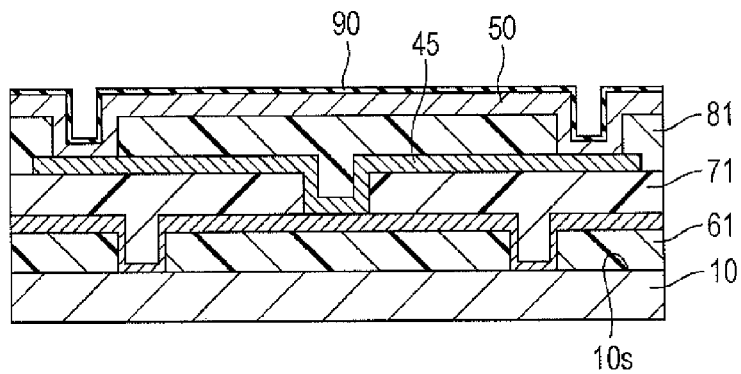
FIGS. 7A to 7D are sectional views illustrating processes of a manufacturing method of the electro-optical device according to an embodiment.
Figure 7B:
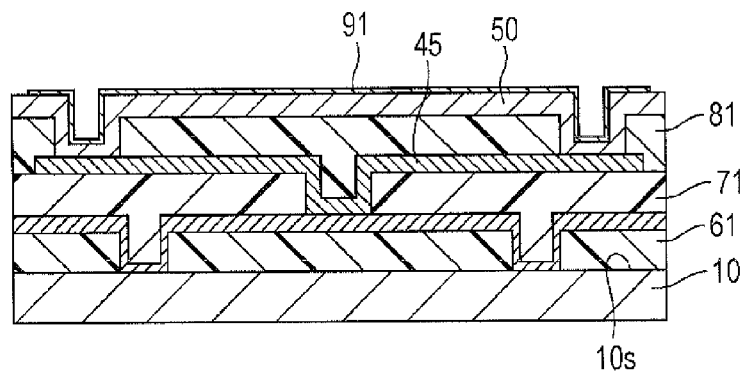
Figure 7C:
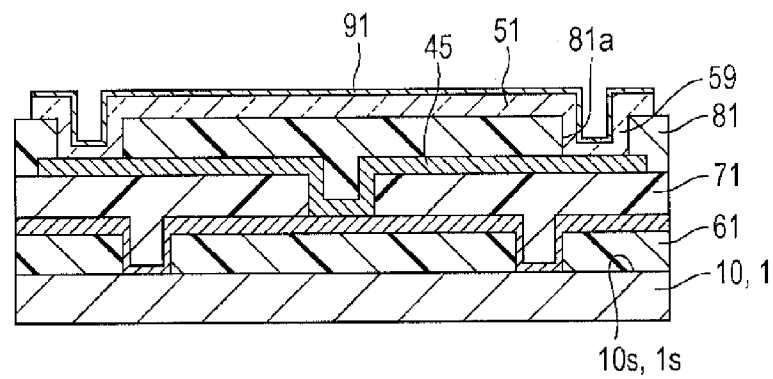
Figure 9C:
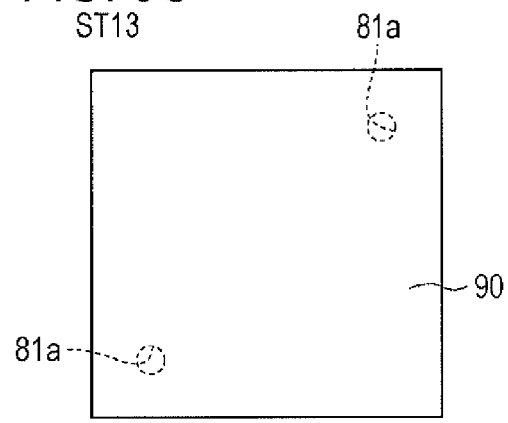
Figure 9F:
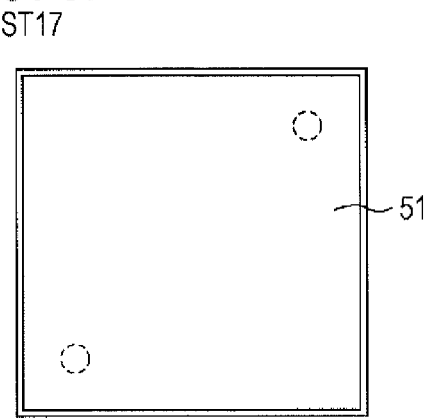

Subsequently, in step ST13 illustrated in FIG. 7A, an inorganic film 90 such as silicon oxide ($SiO_2$) is formed through a PECVD method or the like (refer to FIG. 9C). Subsequently, in step ST14 illustrated in FIG. 7B, the inorganic film 90 is etched in a state in which a resist mask is formed on a surface (surface at a side opposite to the wafer 10) of the inorganic film 90, and thereby an etching stopper layer 91 having the same plan shape as the mirror 51 is formed (refer to FIG. 9D). Thereafter, the resist mask is removed. Subsequently, in step ST15 illustrated in FIG. 7C, the third conductive film 50 is patterned by using the etching stopper layer 91 as a mask, and thereby the mirror 51 is formed (refer to FIG. 9E). At this time, the mirror supporting post 59 is formed by the third conductive film 50 remaining in the opening 81a for the mirror supporting post. The steps ST13, ST14, and ST15 are a third patterning step.

Subsequently, in step ST16, the wafer 10 is into a plurality of substrates 1, each having a size of a single piece.

Figure 7D:
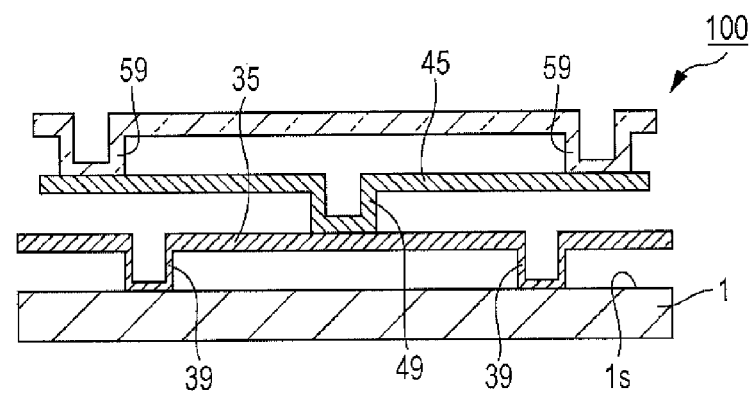

Subsequently, in step ST17 (sacrificial layer removing step) illustrated in FIG. 7D, the first sacrificial layer 61, the second sacrificial layer 71, and the third sacrificial layer 81 are removed by performing plasma etching or the like. At this time, the etching stopper layer 91 is removed. As a result, the electro-optical device 100 is obtained.

Another Configuration Example of Electro-Optical Device 100

Figure 10:
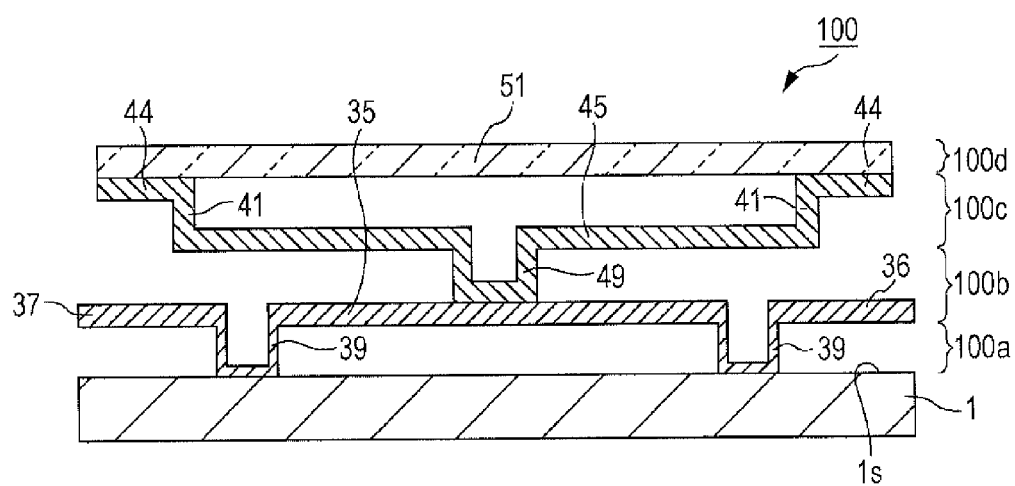
FIG. 10 is a sectional view illustrating another configuration of the electro-optical device according to an embodiment.

FIG. 10 is a sectional view illustrating another configuration of the electro-optical device 100 according to an embodiment. FIGS. 11A to 11E are step sectional views illustrating a method of manufacturing the electro-optical device 100 illustrated in FIG. 10. Since a basic configuration of the present embodiment is the same as that of the first embodiment, the same symbols or reference numerals will be attached to the same sections, and description thereof will be omitted.

In the embodiment described with reference to FIGS. 4A and 4B and the like, the mirror supporting post (mirror supporting section) 59 and the mirror 51 are formed as one piece, but in the present embodiment, as illustrated in FIG. 10, a mirror supporting section 41 and the second torsion hinge (second twist hinge) 45 are formed as one piece, a flat plate section 44 extends along the mirror 51 from an end section of the mirror supporting section 41 at a side opposite to the substrate 1. In addition, the mirror 51 is in contact with a surface of the flat plate section 44 at a side opposite to the substrate 1. For this reason, a dent is not formed on the surface of the mirror 51. Thus, it is possible to increase utilization efficiency of light, and to prevent contrast from lowering due to scattering at the mirror 51.

Figure 11A:
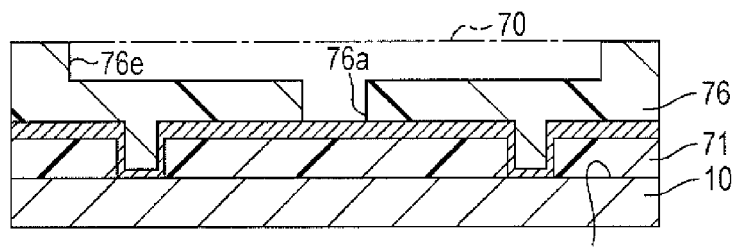
FIGS. 11A to 11E are sectional views illustrating processes of a manufacturing method of the electro-optical device illustrated in FIG. 10.

In order to manufacture the electro-optical device 100 with the configuration, as illustrated in FIG. 11A, after the first torsion hinge (first twist hinge) 35 is formed, the second photosensitive resist layer 70 which is configured by a positive-type organic photoresist or the like is formed such that the first torsion hinge 35 is covered from a side opposite to the wafer 10, in step ST101 (second sacrificial layer forming step). Subsequently, exposure and development are performed and thereby a second sacrificial layer 76 is formed. At this time, an opening (opening for the second hinge supporting section) 76a for the second hinge post for forming the second hinge post (second hinge supporting section) 49 is formed on the second sacrificial layer 76, and a concave section 76e which includes the opening 76a for the second hinge post in a bottom section is formed. In the step, for example, if development is performed after exposure is performed by using a half tone mask, it is possible to easily form the second sacrificial layer 76.

Figure 11B:
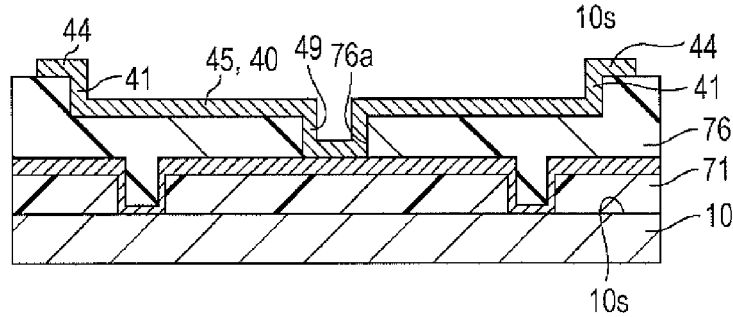

Subsequently, in step ST102 illustrated in FIG. 11B, in a second conductive film forming step, the second conductive film 40 is formed on an entire surface (surface at a side opposite to the wafer 10) of the second sacrificial layer 76 and in the inside of the opening for the second hinge post, and thereafter in a second patterning step, the second conductive film 40 is etched in a state in which a resist mask is formed on a surface (surface at a side opposite to the wafer 10) of the second conductive film 40, and thereby the second torsion hinge 45 is formed. At this time, the second hinge post 49 and the second torsion hinge 45 are formed as one piece by the second conductive film 40 remaining in the opening 76a for the second hinge post. In addition, the mirror supporting section 41 including the flat plate section 44, and the second torsion hinge 45 are formed as one piece at a side of the second torsion hinge 45 opposite to the substrate 1.

Figure 11C:
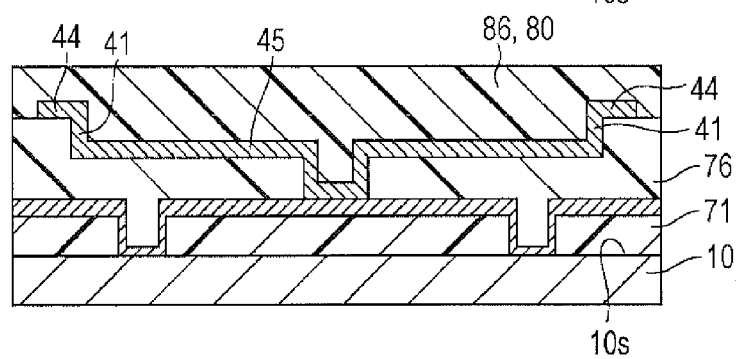

Subsequently, in step ST103 (third sacrificial layer forming step) illustrated in FIG. 11C, after a third photosensitive resist layer 80 which is configured by a positive-type organic photoresist or the like is formed such that the second torsion hinge 45 is covered from a side opposite to the wafer 10, the third photosensitive resist layer 80 is cured, and thereby a third sacrificial layer 86 is formed.

Figure 11D:
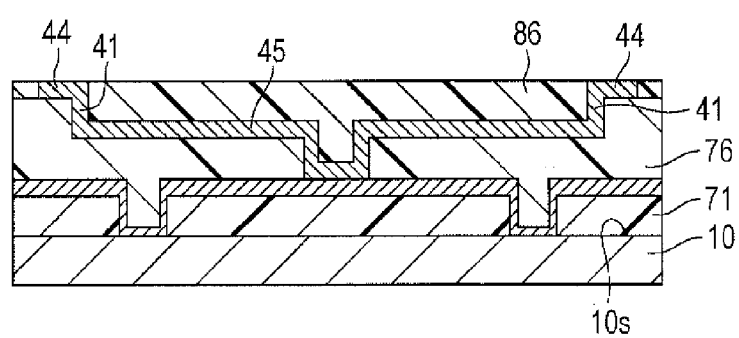

Subsequently, in step ST104 (planarization step) illustrated in FIG. 11D, the third sacrificial layer 86 is planarized from a side opposite to the wafer 10 through a CMP method or the like, and thereby the flat plate section 44 of the mirror supporting section 41 is exposed.

Figure 11E:
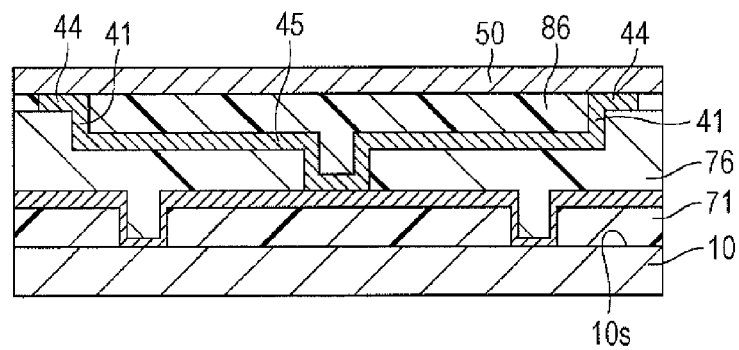

Subsequently, in step ST105 (third conductive film forming step) illustrated in FIG. 11E, a third conductive film 50 for forming the mirror 51 is formed on an entire surface (surface at a side opposite to the wafer 10) of the third sacrificial layer 86. The subsequent steps are the same as those described with reference to FIGS. 7A to 7D, and thus description thereof will be omitted.

Another Embodiment

In the embodiment described above, in the planarization step described with reference to FIG. 11D, the planarization is performed such that the flat plate section 44 of the mirror supporting section 41 remains, but the planarization may be performed until the flat plate section 44 disappear. In the embodiment described above, the etching stopper layer 91 is removed, but the etching stopper layer 91 may be formed as an enhanced reflective film which is configured by a dielectric multilayer film or the like, and may remain on the surface of the mirror 51.

In addition, in the embodiment described above, a width of the first torsion hinge (first twist hinge) 35 is set to be greater than that of the second torsion hinge (second twist hinge) 45, but it is possible to obtain effects in which larger tilt of the mirror than that of a structure of the related art can be ensured, even in a case the width of the first torsion hinge 35 is equal to or narrower than that of the second torsion hinge 45.

In the embodiment described above, the second hinge post (second hinge supporting section) 49 is formed in one place of the center in a length direction of the first torsion hinge 35, but may be formed in two places or more near the center. In this case, even if rotating stress is applied to the mirror in a normal direction of the substrate, the first torsion hinge 35 is ensured in two places or more, and thereby the first torsion hinge 35 is strengthened with respect to the rotation stress. Accordingly, breakage of the mirror hardly occurs.

In the examples described above, thicknesses of the second sacrificial layer 71 and the third sacrificial layer 81 are 1.5 µm. As a result, the heights of the second hinge post 49 and the mirror supporting post (mirror supporting section) 59 are equal to each other, but the thicknesses of the second sacrificial layer 71 and the third sacrificial layer 81 are different from each other, and thus heights of the second hinge post 49 and the mirror supporting post 59 may be different from each other. Specifically, the thickness of the second sacrificial layer 71 may be 1 µm, and the thickness of the third sacrificial layer 81 may be 1.5 µm. In this case, it is possible to decrease the height of the second hinge post 49, and thereby strength of the second hinge post 49 increases. In addition, if the thickness of the second sacrificial layer 71 is greater than that of the third sacrificial layer 81, the height of the mirror supporting post 59 can be less than that of the second hinge post 49, and thus it is possible to increase the strength of the mirror supporting post 59.

In the examples described above, the opening diameters of the opening (opening for the second hinge supporting section) 71a for the second hinge post and the opening (opening for the mirror supporting section) 81a for the mirror supporting post are all 0.8 µm, and as a result, diameters of the second hinge post 49 and the mirror supporting post 59 are equal to each other, but the opening diameters of the opening 71a for the second hinge post and the opening 81a for the mirror supporting post may be different from each other. Specifically, by reducing the diameter of the opening 81a for the mirror supporting post, the diameter of the mirror supporting post 59 can be reduced, and thereby it is possible to prevent a dent from being formed on the surface of the mirror, to increase utilization efficiency of light, and to prevent contrast from lowering due to scattering at the mirror 51.

In another configuration example of the electro-optical device 100 described above, the mirror 51 is formed on the flat plate section 44 of the mirror supporting section 41, and thereby a dent is not formed on the surface of the mirror 51, utilization efficiency of light is increased, and contrast is prevented from lowering due to scattering at the mirror 51, but in the configuration illustrated in FIG. 3B, by filling a dent on the surface of the mirror which is formed by the mirror supporting post 59 with a resin, an inorganic material or the like, and thereafter forming a film with reflectivity on the third conductive film 50, it is possible to obtain a planarized mirror.

What is claimed is:

1. An electro-optical device comprising:
   a substrate;
   a first torsion hinge that is disposed above the substrate and is coupled to a stopper;
   a first hinge support member disposed between the substrate and the first torsion hinge, the first hinge support member supports the first torsion hinge;
   a second torsion hinge disposed above the first torsion hinge;
   a second hinge support member disposed between the first torsion hinge and the second torsion hinge, the second hinge support member supports the second torsion hinge and does not overlap the first hinge support member in a planar view of the substrate;
   a mirror disposed above the second torsion hinge, and the stopper being configured to come in contact with the mirror when the mirror is in a tilted position; and a mirror support member disposed between the second torsion hinge and the mirror, the mirror support member supports the mirror and does not overlap the second hinge support member in the planar view of the substrate.

2. The electro-optical device according to claim 1, the first torsion hinge extends along a first direction,
the second hinge support member is a first hinge support post positioned in a center of the first torsion hinge along the first direction,
the first hinge support member includes a second hinge support post and a third hinge support post, the second hinge support post is positioned at one end of the first torsion hinge and the third hinge support post is positioned at another end of the first torsion hinge, and
the mirror support member includes a first mirror support post and a second mirror support post, and the first mirror support post is positioned at one end of the second torsion hinge and the second mirror support post is positioned at another end of the second torsion hinge.

3. The electro-optical device according to claim 1, wherein the stopper comprises spring chips, and the spring chips extend from the first torsion hinge and come into contact with the mirror and limit a turn range of the mirror when the mirror turns.

4. The electro-optical device according to claim 1, a thickness of the first torsion hinge is greater than a thickness of the second torsion hinge.

5. The electro-optical device according to claim 1, a width of the first torsion hinge is greater than a width of the second torsion hinge.

6. The electro-optical device according to claim 1, further comprising:
a plurality of address electrode portions, each address electrode portion being disposed on the substrate and overlaps the mirror in the planar view; and
a bias electrode disposed on the substrate and overlaps the mirror in the planar view,
the mirror is electrically coupled to the bias electrode through the mirror support member, the second torsion hinge, the second hinge support member, the first torsion hinge and the first hinge support member, and
electrostatic force is generated between the mirror and one of the plurality of the address electrode portions by applying a voltage to the one of the plurality of the address electrode portions.

7. The electro-optical device according to claim 6, each of the plurality of address electrode portions includes a first address electrode, a first upper address electrode and a first electrode support member, the first address electrode is disposed on the substrate, the first upper address electrode is disposed between the first address electrode and the mirror, and the first electrode support member supports the first upper address electrode relative to the first address electrode, and
the first upper address electrode is electrically coupled to the first address electrode through the first electrode support member, and
the first address electrode protrudes from the first upper address electrode in the planar view.

8. The electro-optical device according to claim 7, each of the plurality of address electrode portions further includes a second upper address electrode and a second electrode support member, the second upper address electrode is disposed between the first upper address electrode and the mirror, and the second electrode support member supports the second upper address electrode relative to the second address electrode, and
the third second address electrode is electrically coupled to the first upper address electrode through the second electrode support member, and
the first address electrode protrudes from the second upper address electrode in the planar view.

9. An electronic apparatus comprising:
the electro-optical device according claim 1; and
a light source configured to emit light to the mirror.

10. An electro-optical device comprising:
a substrate;
a first torsion hinge that is disposed above the substrate and is coupled to a stopper;
a first hinge support member protrudes from the first torsion hinge toward the substrate and supports the first torsion hinge;
a second torsion hinge disposed above the first torsion hinge;
a second hinge support member that supports the second torsion hinge relative to the first torsion hinge and does not overlap the first hinge support member in a planar view;
a mirror which is disposed above the second torsion hinge, and the stopper being configured to come in contact with the mirror when the mirror is in a tilted position; and
a mirror support member which supports the mirror relative to the second torsion hinge and does not overlap the second hinge support member in the planar view.

11. The electro-optical device according to claim 10, the first hinge support member includes a first hinge support post and a second hinge support post, the first hinge support post is positioned at one end of the first torsion hinge and the second hinge support post is positioned at another end of the first torsion hinge.

12. The electro-optical device according to claim 10, the second torsion hinge extends along a first direction,
the second hinge support member is a hinge support post, and
the hinge support post is positioned in a center of the first torsion hinge along the first direction.

13. The electro-optical device according to claim 12, the hinge support post protrudes from the second torsion hinge toward the first torsion hinge.

14. The electro-optical device according to claim 10, the mirror support member includes a first mirror support portion and a second mirror support portion, and the first mirror support portion is positioned at one end of the second torsion hinge and the second mirror support portion is positioned at another end of the second torsion hinge.

15. The electro-optical device according to claim 10, the first torsion hinge extends along a first direction, and
the second torsion hinge extends along the first direction.

16. An electronic apparatus comprising:
the electro-optical device according to claim 15; and
a light source configured to emit light to the mirror.

17. The electro-optical device according to claim 10, further comprising:
a plurality of address electrode portions, each address electrode portion is disposed on the substrate and overlaps the mirror in the planar view;
a bias electrode disposed on the substrate and overlaps the mirror in the planar view, and the mirror is electrically coupled to the bias electrode through the mirror support member, the second torsion hinge, the second hinge support member, the first torsion hinge and the first hinge support member, and electrostatic force is generated between the mirror and one of the plurality of the address electrode portions by applying a voltage to the one of the plurality of the address electrode portions.

18. The electro-optical device according to claim 17, each of the plurality of address electrode portions includes a first address electrode, a first upper address electrode and a first electrode support member, the first address electrode is disposed on the substrate, the first upper address electrode is disposed between the first address electrode and the mirror, and the first electrode support member supports the first upper address electrode relative to the first address electrode,
the first upper address electrode is electrically coupled to the first address electrode through the first electrode support member.

19. The electro-optical device according to claim 18, each of the plurality of address electrode portions further includes a second upper address electrode and a second electrode support member, the second upper address electrode is disposed between the first upper address electrode and the mirror, and the second electrode support member supports the second upper address electrode relative to the first upper address electrode, and
the second upper address electrode is electrically coupled to the first upper address electrode through the second electrode support member.

20. An electro-optical device comprising:
a substrate;
a first hinge that is disposed above the substrate and is coupled to a stopper;
a first hinge support member that supports the first hinge over the substrate;
a second hinge disposed above the first hinge;
a second hinge support member that supports the second hinge over the first hinge in a position that does not overlap the first hinge support member in a planar view;
a mirror disposed above the second hinge, and the stopper being configured to come in contact with the mirror when the mirror is in a tilted position; and
a mirror support member that supports the mirror over the second hinge in a position that does not overlap the second hinge support member in the planar view.

21. An electro-optical device comprising:
a substrate;
a first torsion hinge disposed above the substrate in a thickness direction and is coupled to a stopper, the first torsion hinge having a first hinge support portion configured to support the first torsion hinge in the thickness direction;
a second torsion hinge disposed above the first torsion hinge in the thickness direction, the second torsion hinge having a second hinge support portion configured to support the second torsion hinge in the thickness direction;
a mirror disposed above the second torsion hinge in the thickness direction, the mirror having a mirror support portion configured to support the mirror in the thickness direction, and the stopper being configured to come in contact with the mirror when the mirror is in a tilted position;
the second hinge support portion does not overlap the first hinge support portion in a planar view of the substrate, and
the mirror support portion does not overlap the second hinge support portion in the planar view of the substrate.

* * * * *